United States Patent [19]

Cage

[11] Patent Number: 4,712,841
[45] Date of Patent: Dec. 15, 1987

[54] FAIL SAFE CIRCUIT FOR AN ANTI-LOCK BRAKING SYSTEM MODULATOR DRIVE

[75] Inventor: Jerry L. Cage, Granger, Ind.
[73] Assignee: Allied Corporation, Morristown, N.J.
[21] Appl. No.: 932,120
[22] Filed: Nov. 19, 1986
[51] Int. Cl.$^4$ ............................................. B60T 8/88
[52] U.S. Cl. ................................... 303/92; 303/119
[58] Field of Search .............. 303/92, 20, 119, 113, 303/91; 364/426

[56] References Cited

U.S. PATENT DOCUMENTS

| | | | |
|---|---|---|---|
| 4,270,808 | 6/1981 | Brearley | 303/92 |
| 4,494,801 | 1/1985 | Ohmori et al. | 303/92 |
| 4,661,910 | 4/1987 | Reinecke et al. | 303/92 |

Primary Examiner—Duane A. Reger
Assistant Examiner—Matthew C. Graham
Attorney, Agent, or Firm—Ken C. Decker

[57] ABSTRACT

The invention is a fail-safe circuit for an anti-lock braking system which includes a drive circuit connected between the output of an anti-lock control and an output connector thereof that also provides connection for the system's solenoid actuated modulating valves. An energizing relay for the solenoids is connected to receive the output from the drive circuit. Control signals for the energizing relay and solenoid actuated modulating valves are of opposite polarity such that a short circuit to either positive or ground will disable the anti-lock system and obviate false operation thereof.

7 Claims, 4 Drawing Figures

FAIL SAFE CIRCUIT FOR AN ANTI-LOCK BRAKING SYSTEM MODULATOR DRIVE

BACKGROUND OF THE INVENTION

The present invention relates to fail-safe circuits for use in anti-lock braking systems and in particular to a circuit for use in conjunction with the output circuit of the electronic control unit of such a braking system to obviate erroneous operation of the system's modulating valves in response to electrical shorts.

Anti-lock braking systems are now well known. Typically, such systems incorporate a micro-processor based control unit which receives signals via appropriate sensors associated with the vehicle's wheels to determine the existence of an imminent wheel-lock condition during braking. Upon determining the existence of such a condition, the control unit generates control signals which are applied to solenoid operated modulating valves which automatically control the application of pressurized braking fluid to the vehicle's brakes. It is also typical for such systems to incorporate a power relay operatable in response to a signal from the control unit for supplying operating energy to the solenoid valves. It is further well known that a motor vehicle's electrical system, which includes such elements as a high voltage ignition, an alternator, and various relays and switches, generates a substantial number of spurious signals, noise and the like and that the components of the vehicle including the relatively sophisticated electronic components associated with an anti-lock braking system exist in a hostile environment which includes wide temperature swings, saltwater, pollutants and the like.

Since an anti-lock braking system is an integral part of the vehicle's braking system it is extremely important that the system be as nearly fail-safe as possible to obviate improper operation of the vehicle's brakes and further to assure that the system will shut down and restore, as nearly as possible, normal functioning of the vehicle's brakes in the event of a system failure.

One of the potential failures that can affect such an anti-lock braking system is the occurrence of short circuits in the wires or connectors associated with the control unit, energizing relay, and modulating valve solenoids, such problems being particularly acute when these elements are subjected to such media as saltwater or other corrosive and/or conductive pollutants. Under such circumstances, short circuits can create a situation simultating a control signal thereby resulting in false operation of the system and possible failure thereof. Accordingly, there exists a need to provide circuitry that will reduce the possibility of spurious operation of the anti-lock braking system's solenoid valves and/or energizing relay caused by saltwater or similar conductive and/or corrosive materials.

Broadly, it is a fail-safe circuit for preventing false operation of the solenoid control valves of an anti-lock braking system. The circuit is used in conjunction with the control circuit for the anti-lock braking system, the latter including a computing circuit for receiving signals indicative of the rotational behavior of the vehicle's wheels and generating a plurality of braking control signals in response thereto. The system further includes a plurality of braking pressure solenoid control valves responsive to the control signals for modulating the application of the pressurized braking fluid to the vehicle's wheels. The circuit includes a relay driver circuit which is connected to the competing circuit to generate an output signal of polarity opposite the polarity utilized to actuate the solenoid valves. An output connector is provided for the control unit and connects the driver circuit to the solenoid energizing relay and to the solenoid operated modulating valves. The other terminals of the solenoid operated modulating valves are connected to a source of operating energy through the contacts of the energizing relay whereby a short circuit in the connecting wires or the pins of the connector will disable one of the relay of the solenoid valves in response to short circuits which cause spurious application of operating voltage thereto and conversely will disable the other of the relay or the solenoids in response to a short ground.

It is therefore an object of the invention to provide a fail-safe circuit for an anti-lock braking system which prevents the false operation of solenoid control valves and energizing relay caused by short circuits in the connectors and/or wiring between the control unit and the relay and solenoids.

It is another object of the invention to provide such a circuit which will operate in response to a short circuit to a positive potential to disable one of the relay and solenoid valves and to a short circuit to ground to disable the other of the relay or the solenoid valves.

Still another object of the invention is to provide such a circuit which can be incorporated in an anti-lock braking system with minimum cost while simultaneously providing high reliability.

BRIEF DESCRIPTION OF THE DRAWINGS

These and other objects and purposes of the invention will be best understood when taken in conjunction with the following detailed description of the invention in conjunction with the appended drawings wherein.

DESCRIPTION OF THE PREFERRED EMBODIMENT

Figure 1:
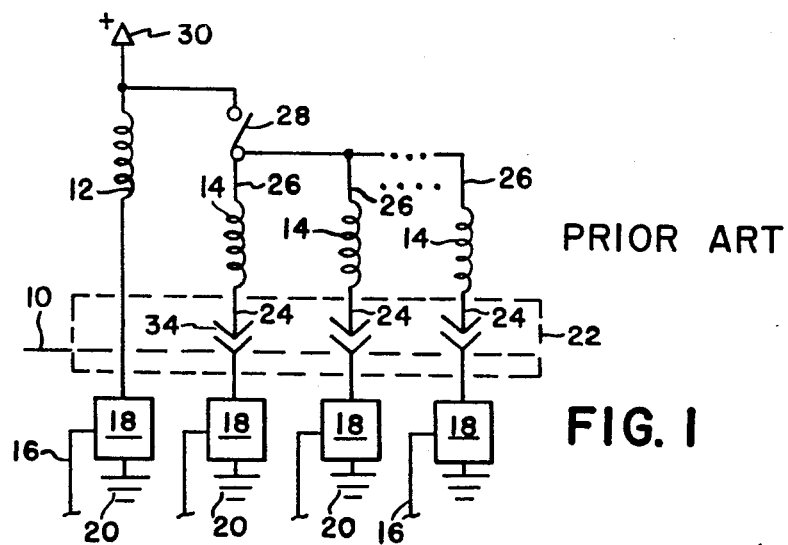
FIG. 1 is a simplified block diagram representative of prior art circuitry used in anti-lock braking systems to connect the electronic control unit to an energizing relay and solenoid valves.

Referring now to the drawings, there is shown in FIG. 1 a simplified block diagram including the electrical connections between an electronic control unit 10, energizing relay 12 and modulating solenoid 14 of an anti-lock braking sytem. The electronic control unit, in now well known manner, receives input signals from sensors such as magnetic pickups and tone wheel assemblies mounted to the wheels of a motor vehicle. These signals are directly proportional to the speed of the wheels. A computing circuit, typically a micro processor based unit, utilizes these input signals to analyze the braking behavior of the vehicle's brakes. Upon sensing an incipient skid or wheel-lock condition, the control unit generates output signals to automatically decrease and increase braking pressure as necessary to prevent wheel-lock. These output signals are applied via signal lines 16 to a plurality of output drivers 18. The output drivers are typically field effect transistor devices which are normally open circuits and which provide a closed circuit to ground 20 in response to an appropriate signal from the computing circuit.

These signals are passed through a multi pin electrical connector 22 to one terminal 24 of the solenoid coils 14. Solenoid coils 14 in turn operate hydraulic valves. In a typical anti-lock braking system, such as for example the one disclosed in copending U.S. patent application Ser. No. 789,203, filed Oct. 18, 1985 commonly assigned with the present invention, there are solenoid operated valves provided to isolate the wheel cylinders of the vehicle from the master cylinder, and two additional solenoid controlled valves which are intermittently operated to effect decay and build of hydraulic pressure at the wheel cylinder. Collectively these valves comprise a modulating means.

The other terminals 26 of the solenoid coils 14 are connected through relay contacts 28 to a source of operating potential 30, typically a motor vehicle's battery. The relay contacts 28 are in turn operated by the energizing relay coil 12, coil 12 being operated in response to a signal from a predetermined one of the output drivers 18 the electronic control unit 10. The relay 12 typically operates to close contacts 28 when the braking system is operative and operates to open the contacts 28 to disable the anti-lock braking system when the vehicle is not in operation or when the electronic control unit senses a defect within the anti-lock braking system.

Figure 4:
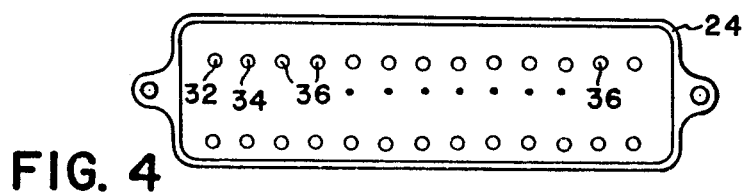
FIG. 4 is a plan view of a typical connector configuration used with the electronic control unit of an anti-lock braking system and useful in explaining operation of the invention.

Referring now to FIG. 4, there is illustrated in plan view multi pin electrical connector 24. Connector 24 includes a plurality of pins as at 32. The various connections to the pins are as labelled with pin 34 being connected to the relay coil 12 and pin 36 being connected to the solenoid coils 14. Typically electronic control unit 10 is mounted in an available space of the vehicle such as the engine compartment. In this environment the unit and the connector 24 are exposed to contaminents such as saltwater. This can produce short circuits between the pins 34 or 36 and either ground or to sources of positive potential such as for example the B+ supply line to the unit 10. Under these conditions, it is possible for the relay 12 to be activated when the electronic control unit 10 has in fact generated a control signal to render the relay off or inoperative. Similarly, a short circuit to ground or to positive potential can result in false or spurious operation of one or more of the solenoid coils 14. Since these elements directly affect operation of the vehicle's brakes, it is desirable to obviate such false operation.

Figure 2:
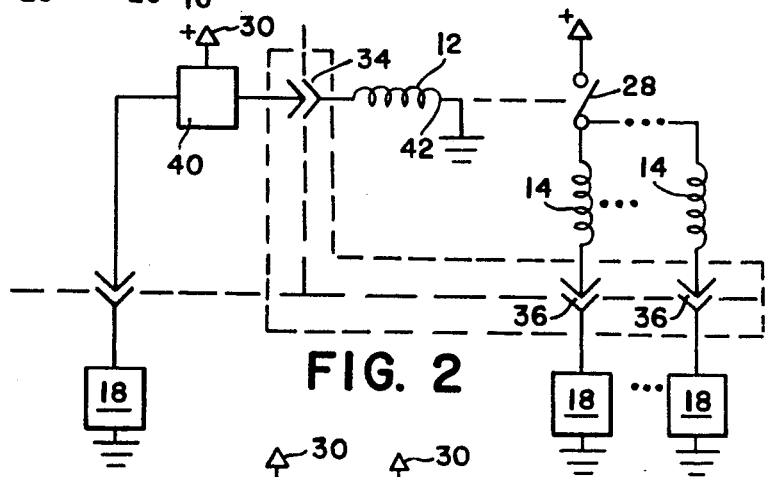
FIG. 2 is a simplified block diagram of a fail-safe circuit in accordance with the present invention.

For this purpose, the present invention provides a relay driver circuit connected as shown in FIG. 2. Relay driver circuit 40 is incorporated in a circuit board within the electronic control unit 10, the latter typically being in a sealed enclosure. The driver circuit 40 is connected to the driver 18 which drives the relay 12 in the prior embodiment of FIG. 1. Positive potential is provided to the driver circuit 40 via an internal connection within the electronic control unit, typically receiving its voltage from the same source as the control unit 10. The output from the relay driver 40 is applied through the connector 24 pin 34 which is connected to the relay coil 12. However, the opposite terminal 42 of the relay coil is grounded and the driver circuit 40 effects operation of the coil 12 by applying a positive voltage thereto. The remainder of the circuit is as described in reference to FIG. 1, like numerals referring to like elements. The physical electrical connections are also made in a manner substantially identical to that of embodiment of FIG. 1 and FIG. 4. In operation, it will now be observed that in the event that a short circuit should occur as a result of a medium such as saltwater, this short circuit will simultaneously produce either a ground connection at terminal 34 and terminals 36 or, in the alternative, may produce a positive voltage at terminal 34 and pins 36. In the event that the short circuit is to ground, the relay driver will be disabled since the ground short will prevent the output from the driver circuit 40 from reaching the coil 12 to operate same. Since the coil 12 is inoperative, relay contacts 28 remain open and the modulating solenoids 14 are also inoperative.

Conversely, should the short to the pins of the connector result in the application of a positive potential thereto, the short may result in energizing the relay 12. Simultaneously, however, this positive potential will negate operation of the solenoids 14 since it will counter the potential applied thereto via the relay contacts 28. Again, the modulating solenoids will not operate and false or spurious operation of the anti-lock braking system cannot occur.

Figure 3:
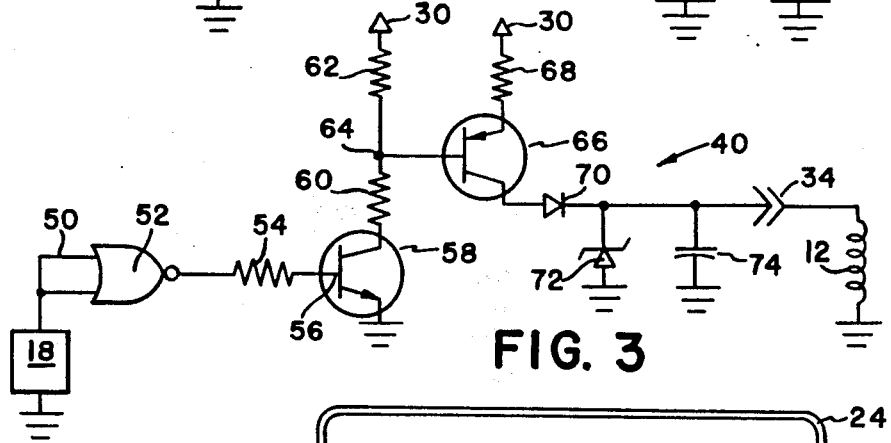
FIG. 3 is a detailed circuit diagram of the relay driver circuit for use in the invention.

Referring to FIG. 3, there is shown an electrical schematic of a suitable driver circuit 40 to drive of the relay 12. The electronic control unit driver 18 associated with the relay 12 is connected to the inputs 50 of a NOR gate 52. The output from the NOR gate 52 is applied via resistor 54 to the base 56 of a PNP transistor 58. The collector of transistor 58 is connected via resistors 60, 62 to B+ 30. The common connection 64 of resistors 60, 62 provides an output which is applied to the base of a transistor 66 which has its emitter connected to B+ 30 via resistor 68. The collector of transistor 66 provides an output through diode 70 to the relay coil 12. The output from the transistor 66 is regulated and filtered by means of zener diode 72 and capacitor 74, respectively. Connector pin 34 provides a connection between the driver circuit 40 and the relay coil 12. In operation, when the driver 18 is activated, it provides a ground or zero signal to the input 50 producing a high output to the base of transistor 58. This turns transistor 58 on, conduction of transistor 58 being at saturation level by proper selection of resistor 62, 64. This turns on the transistor 66 to provide B+ voltage to the diode 70 to the relay coil 12.

With the above described circuit, it now may be seen that if the connector 24 or the connecting wires are exposed to an electrolyte, the relay driver 40 will tend to be pulled low by the proximity of the ground connections. The same electrolyte short circuit, while it would tend to activate the solenoid coils 14, effectively disables the relay 12 whereby operating potential is no longer available to the solenoid coils 14. Conversely, if the electrolyte solution conducts positive potential to the relay driver output terminal 34, the same positive potential will, because of the proximity of the connector pins and wiring, apply positive potential to the solenoids 14 which counters energizing potential applied thereto through the relay contacts 28. This again disables modulating valve solenoid coils 14 thereby obviating false or spurious operation.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

I claim:

1. In an anti-lock braking system which includes sensor means coupled to the wheels of a vehicle to generate signals corresponding to the rotational behavior of said wheels, an electronic control unit connected to said sensor means to receive said signals and generate a plurality of control signals of first predetermined polarity in response to an incipient wheel lock condition, an electrical connecting means, at least one solenoid operated modulating valve connected to said electronic control unit through said connecting means for operation in response to predetermined ones of said control signals, a relay connected to said electronic control unit through said connecting means and operative in response to a predetermined one of said control signals to connect said modulating valve to a source of operating potential, the improvement comprising a relay driver circuit connected between said electronic control unit and said connector means, said relay driver circuit generating a relay control signal in response to said predetermined one of said control signals and of a polarity opposite said first predetermined polarity, one of said relay and said solenoids being electrically disabled in response to a short circuit between said connecting means and a source of said first polarity, the other of said relay and said solenoids being electrically disabled by a short circuit between the said connecting means and a source of said opposite polarity.

2. The system claim 1 wherein said braking control signals are ground signals, said solenoid valves being connected to said source of potential through the contacts of said relay.

3. The system of claim 2 wherein said predetermined one of said control signals is a ground signal, said relay driver circuit generating a positive signal in response thereto.

4. The system of claim 3 wherein said connecting means includes a multi pin electrical connector, said solenoids and said relay coil being connected to said electronic control unit through adjacent pins of said connector.

5. The system of claim 4 wherein said first polarity is ground, said second polarity is positive, said solenoids being rendered inoperative in response to a short circuit to a positive potential, the said relay being rendered inoperative in response to a short to ground.

6. The system of claim 5 wherein said relay includes normally open control contacts, said relay being operative in response to said positive signal to close said contacts, said solenoids being connected to a source of positive potential through said control contacts.

7. The system of claim 6 wherein said driver circuit includes a logic gate connected to said electronic control unit to receive said predetermined one of said control signals, and a transistor amplifier connected to the output of said logic gate and being operable in response to an output signal from said logic gate to produce a positive potential signal.

* * * * *